Nov. 4, 1941.  G. L. DOELLING  2,261,235
ANTIBUMPING DEVICE
Filed May 13, 1940  3 Sheets-Sheet 1
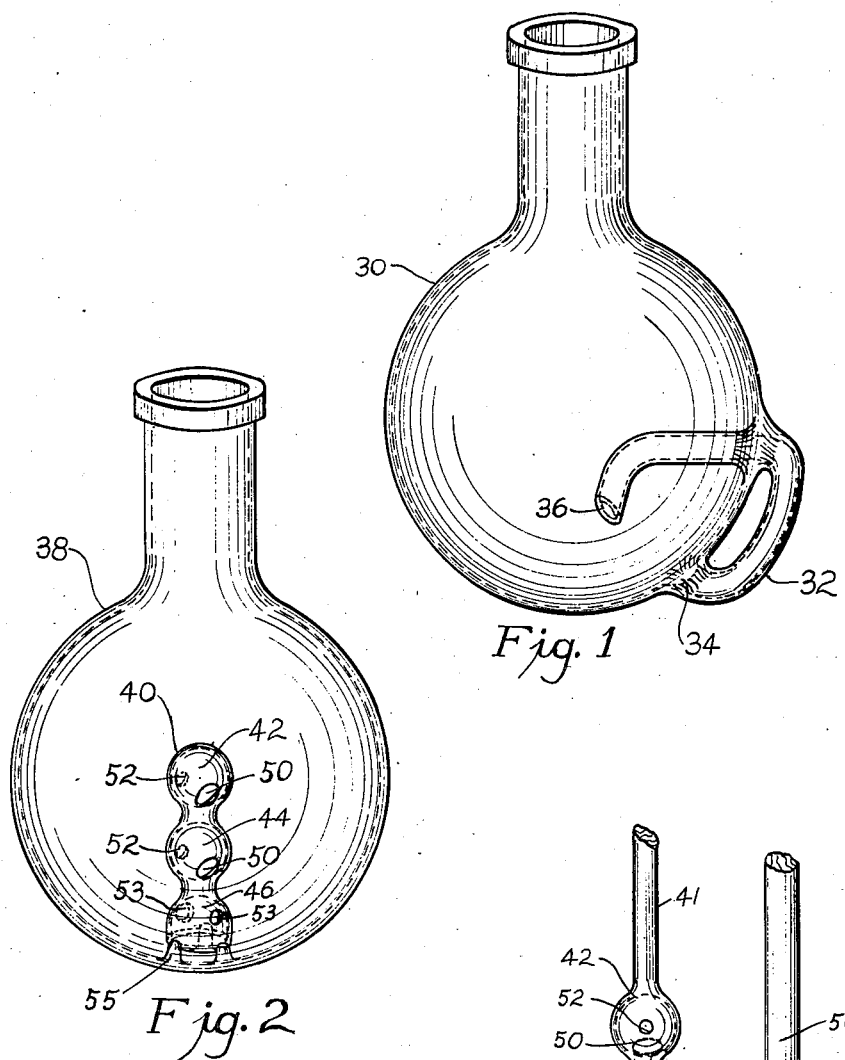
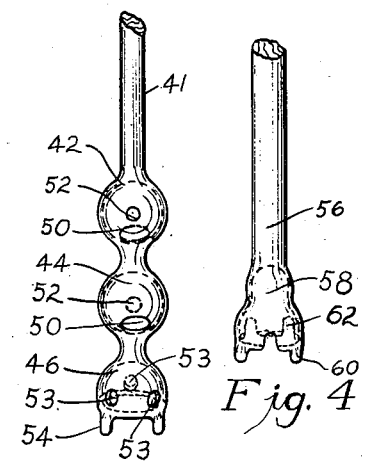
WITNESSES:
INVENTOR:
George L. Doelling
BY
Roy M. Eilers
ATTORNEYS.

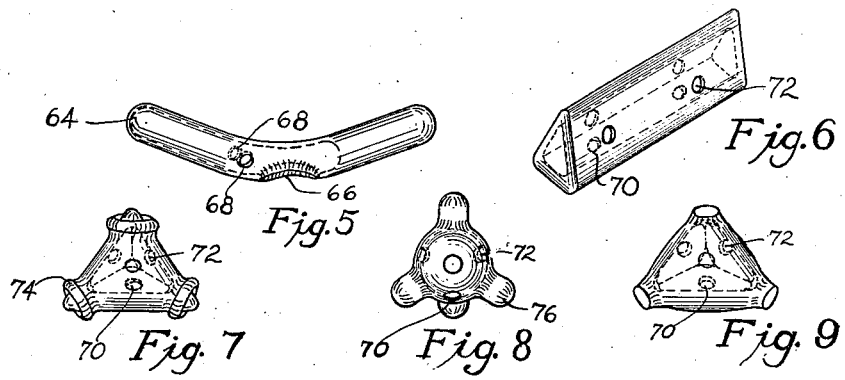
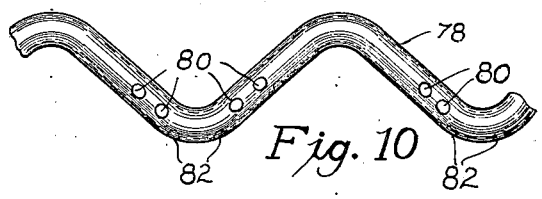
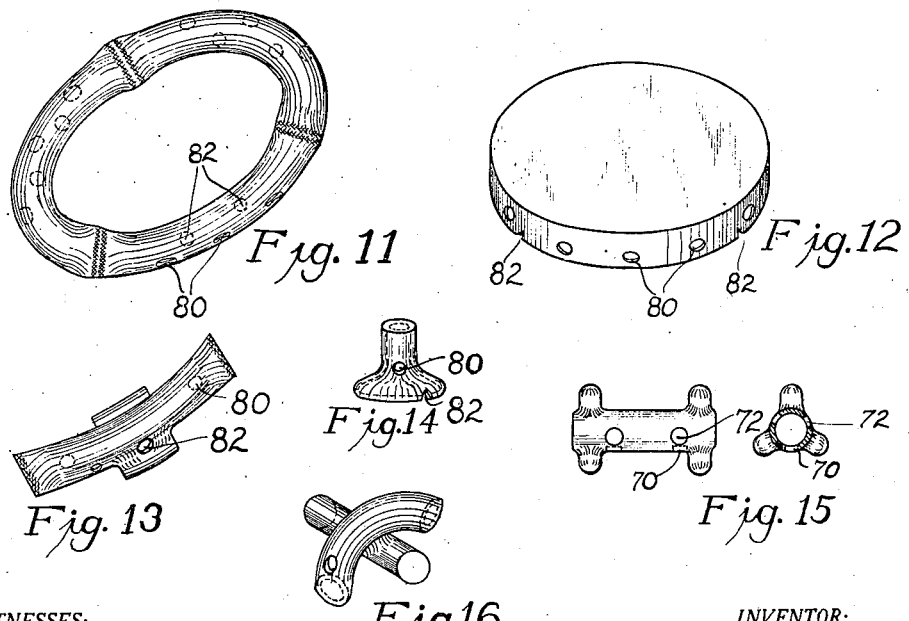

Nov. 4, 1941.  G. L. DOELLING  2,261,235
ANTIBUMPING DEVICE
Filed May 13, 1940  3 Sheets-Sheet 3
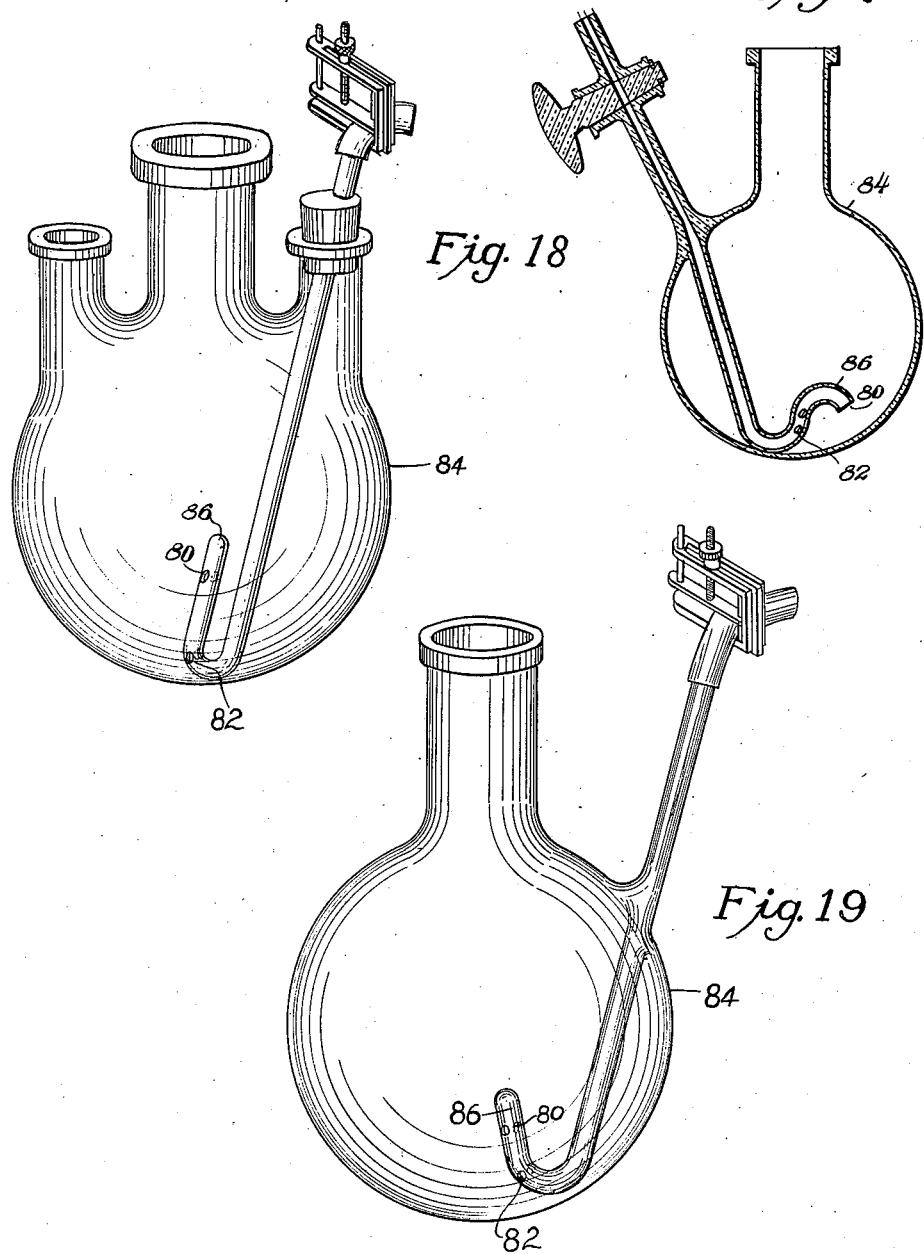
INVENTOR:
George L. Doelling
BY
Roy M. Eilers
ATTORNEYS.

Patented Nov. 4, 1941

2,261,235

UNITED STATES PATENT OFFICE 2,261,235

ANTIBUMPING DEVICE

George L. Doelling, St. Louis, Mo.

Application May 13, 1940, Serial No. 334,949

19 Claims. (Cl. 23—292)

This invention relates to improvements in "anti-bumping" devices used in vaporization processes. More particularly, the invention relates to improvements in "anti-bumping" devices that are designed to maintain a quantity of air or vapor in contact with the liquid contents of a still, evaporator, boiler, or distilling flask during the vaporization process. It is one object of the present invention to provide an "anti-bumping" device of simple construction that is effective in preventing "bumping" in the distillation, vaporization or boiling of liquids.

"Bumping" is a term used to describe the sudden and violent ebullition of liquid from a container during distillation or vaporization processes. "Bumping" is objectionable because it causes the liquid being distilled to erupt and foam, and sometimes enter the tube leading to the receiver containing the distillate. This is known as "flooding." Where the distillation is intended to obtain a pure distillate, "bumping" and resultant "flooding" may contaminate the distillate and render the distillation process ineffectual. Where the vaporization is used to concentrate a solution for quantitative analysis, the "bumping" may result in the loss of a portion of the sample, and such loss would cause an inaccurate analysis. Where the distillation is used to concentrate large quantities of solution, "bumping" decreases the efficiency of the still, evaporator or boiler because the uneven ebullition of vapor limits the amount of liquid per unit time that can be handled by the still, evaporator, or boiler. "Bumping" is especially troublesome in tube evaporators because the "bumping" and uneven boiling necessitate a large increase in size of the evaparator to prevent "flooding," and such a large increase in size reduces the efficiency of operation of the evaporator. Where a liquid that is relatively unstable toward heat is being distilled, "bumping" is very objectionable because "bumping" and a superheated condition in the liquid are found together. The superheated condition in the liquid may serve to cause the relatively unstable liquid to decompose. Where the liquid distils evenly without "bumping," no appreciable amount of super-heating occurs, and decomposition of the liquid is less likely to occur. In addition, efficient fractionation is impossible when "bumping" occurs in the still. It can be seen from the above that "bumping" is quite troublesome in distillation and vaporization processes.

It is known that vaporization of a liquid takes place most readily wherever the liquid contacts air or vapor, and in distillation, the vaporization starts at the exposed surface of the liquid. All of the liquid could be distilled by evaporation from the exposed surface, but this takes too long to be practical. It is necessary, therefore, that the liquid be "boiled" away. In ordinary cases of distillation, the liquid gets quite hot near the source of heat application and suddenly "bumps." In some atmospheric distillations and in most vacuum distillations, the first "bump" is followed by others and "flooding" often occurs. Where, however, air is present in the liquid, as is the case with water drawn from a faucet, the air expands and contacts portions of the liquid and fosters the vaporization of these portions of the liquid. The vaporization of these portions of the liquid yields vapor that fosters the vaporization of the rest of the liquid and causes quiet boiling. In recognition of this effect, persons skilled in the art have designed various devices to hold air in the liquid. One of the devices used is a capillary tube that is closed at one end and is inverted in the fluid. Capillary tubes are helpful only where the rate of vaporization is quite slow and do not help appreciably when the rate of vaporization is moderate or rapid. In addition, these tubes fill with vapor during the heating cycle and fill with liquid whenever the still cools or whenever additional liquid is added to the still. To recharge the tubes, it is necessary to remove them from the still and drain the liquid out of them. Such a procedure is quite disadvantageous and bothersome. Although these tubes have been known for quite some time, they have never been used extensively, and have never been effective in preventing "bumping" except where the rate of vaporization was quite slow.

Probably the most commonly used of all artifices to prevent "bumping" is the use of small pieces of porous ceramic material in the bottom of the still. These pieces of porous material hold a small amount of air in contact with the liquid to be distilled. The pieces of porous material are located near the source of heat application and permit the liquid there to contact the vapor which they hold. Other means that persons skilled in the art have used are chemical compounds such as sodium bicarbonate. These compounds gradually evolve a gas near the source of heat application during distillation. The liberation of the gas results in the ready vaporization of the liquid in contact with the chemical compound and helps somewhat in preventing "bumping." Other means that persons skilled in the art have used are glass beads and glass wool. In vacuum distillations, persons skilled in the art have used capillary tubes that are connected to the outside of the still to provide a continuous flow of air through the contents of the still. The flow of air from the end of the tube causes contact of the liquid and air, and this fosters vaporization at that point. One objection to the use of this type of device lies in the fact that air oxidizes some of the compounds which are distilled under vacuum. Another objection is the lowering of the boiling point of the liquid. This lowering of the boiling point makes fractionation less efficient, and results less reproducible. Persons skilled in the art have attempted to prevent "bumping" in a different way by sandblasting the bottom of the still, by covering the bottom of the still with silica gel, and by covering the bottom of the still with fused glass. These methods have been used to increase surface area in an attempt to make ebullition quiet and more even. Still other artifices have been used to avoid "bumping," among which are the use of metal wires sealed in the still, ring burners, inner heating coils, and induced electric currents. These novel heating arrangements have been used to distribute the heat in the still and prevent "bumping" thereby. Another unusual device which has been used to avoid "bumping" is a still which rotates during distilling operations. Although all of these devices have been used in an attempt to avoid "bumping," the problem has not been solved satisfactorily.

In the case of the devices which hold small quantities of air in the liquid, the heating of the liquid drives out all of the air and replaces it with vapor. When the still is permitted to cool or when the liquid is cooled by the addition of liquid, the vapor in the devices condenses and fills the devices with liquid. As a result, when the distillation is to be continued, the devices have no air or vapor with which to foster quiet evaporation, and "bumping" will occur. This effect is most pronounced in vacuum distillations. As a result, pieces of porous ceramic material, capillary tubes, and other devices that hold air in the liquid can ordinarily be used only once. This is also the case with chemical compounds such as sodium bicarbonate. After one or two heating and cooling cycles, these compounds are usually completely decomposed and can evolve no more gas. Another objection to the use of chemical compounds lies in the contamination of the distillate and the liquid to be distilled. Glass wool is helpful in preventing "bumping" only if a large amount is used. The use of large amounts of glass wool is objectionable where it is necessary to recover the residue in the still, because the wool will hold the residue. The various methods whereby the heating surface of the still is increased, have not been found to be very satisfactory in reducing "bumping." These methods are also rather expensive, and make the task of cleaning the still a difficult one. They are, therefore, objectionable for these reasons. The variations in the heating of the still mentioned above, have not been satisfactory in preventing "bumping" under all conditions, and materially increase the cost of distilling apparatus. The same objection is found with regard to the rotation of the flask during distillation. For the reasons stated above, the "anti-bumping" devices now in use are not satisfactory. The invention obviates the objections stated above, and it is, therefore, an object of the present invention to provide an "anti-bumping" device of simple construction that will effectively obviate "bumping" in vaporization processes.

An effect similar to "bumping" is found in evaporators, stills, and boilers, and this effect limits the rate of vaporization of the liquid to be vaporized. The effect consists of uneven or fitful ebullition of vapor. This necessitates the provision of additional volume to prevent "flooding," and the provision of additional volume decreases the efficiency of the evaporator. The "anti-bumping" devices shown and described in the present invention avoid "bumping" and foster smooth, even evaporation. It is, therefore, an object of the present invention to provide means to insure smooth, even vaporization in a still, evaporator, or boiler.

Other objects and advantages of the invention will be shown and described in the drawings and accompanying description.

In the drawings and description, various preferred adaptations of the invention have been shown and described. For convenience the invention is shown and described as applied to a limited class of stills and evaporators, but the invention may be applied to pipe-stills, stills, distilling flasks, evaporators, boilers or any other vaporization apparatus wherein the "bumping" problem is present. It is to be understood, therefore, that the invention is not limited to the preferred forms shown and described in the drawings and accompanying description, but will be defined by the appended claims.

In the drawings:

Fig. 1 is a view of a flask having an "anti-bumping" device integral therewith.

Fig. 2 is a view of a flask having an "anti-bumping" column positioned therein.

Fig. 3 and Fig. 4 are views of two "anti-bumping" devices that may be inserted in flasks or stills.

Figs. 5 through 9 are views of a number of "anti-bumping" devices that may be placed in the bottom of flasks or stills.

Fig. 10 is a side view of a section of an "anti-bumping" device for use in the tubes of horizontal tube evaporators.

Figs. 11 through 14 show a number of "anti-bumping" devices that are preferably made of metal.

Fig. 15 shows an elevation and a cross-sectional view of an "anti-bumping" device.

Fig. 16 is a view of another form of "anti-bumping" device that may be used in the bottom of a flask or still.

Fig. 17 is a cross-sectional view of a flask having an "anti-bumping" device integral therewith.

Fig. 18 is a view of a three-necked flask having an "anti-bumping" device inserted in the flask through one of the necks, and Fig. 19 is a view of another flask having an "anti-bumping" device integral therewith.

Referring to the drawings in detail, Fig. 1 shows a distilling flask 30 of any suitable design which has an "anti-bumping" device 32 sealed in the wall thereof. This device comprises a tube of substantial cross-sectional area that has two openings 34 and 36. The "anti-bumping" device is so designed that the opening 36 is lower than the upper section of the tube 32, and opening 34 is lower than opening 36. When the flask 30 is filled with the liquid to be distilled, air will be trapped in the upper portions of tube 32. The liquid will rise in the portion of tube 32 outside of flask 30 to the level of opening 36. When heat is applied to the still 30, vaporization will begin at the opening 36 and at the level of the liquid in the tube 32. As vapor is evolved, it will bubble out of opening 36. The evolution of vapor from the tube 32 permits more liquid to enter the tube through opening 34, and this liquid is vaporized in turn. During the vaporization process, all or practically all of the bubbling is concentrated at opening 36, and "bumping" is effectively prevented. When more liquid is added or when the still is permitted to cool, the vapor in tube 32 condenses and the tube is filled with liquid. The operator need only tip the flask a little and entrap some air in the tube 32 to prepare the flask for another heating.

In Fig. 2 a flask 38 is shown that has an "anti-bumping" column 40 positioned therein. This column consists of three chambers 42, 44, and 46. The chamber 46 has a large opening in the bottom thereof and a plurality of holes 53 in the side thereof. The chamber 46 is supported a short distance above the bottom of flask 38 by three legs 55. Mounted on top of chamber 46 is chamber 44. Chamber 44 has a solid bottom and has no connection with chamber 46 whereby vapor could flow from one chamber to the other. A hole 50 is located in the lower portion of chamber 44 and another hole 52 is located in the wall of the chamber about midway between the top and bottom of the chamber. Mounted on top of chamber 44 is chamber 42. Chamber 42 has a solid base and has no connection with chamber 44 whereby vapor could flow from one to the other. An opening 50 is located in the lower portion of chamber 42 and an opening 52 is located in the wall of the chamber about midway between the top and bottom thereof. When flask 38 is filled with liquid to be distilled, air will be entrapped in the upper portions of the three chambers 42, 44, and 46. Liquid will enter the lower portions of the chambers and contact the air in the upper portions of the chambers. As the still gets warm, the liquid in the chambers will vaporize and bubble out of the holes. Whenever a bubble is evolved from the chamber, a temporary decrease in pressure therein will occur, and more liquid will enter the chamber through hole 50. In this way, a continuous stream of bubbles is evolved from the chambers, and the supply of liquid in the chambers is continually being replenished. Whenever more liquid is added to the flask or the flask is cooled, the vapor in the chambers will condense, and the chambers will be filled with liquid. To prepare the flask for another heating cycle, the operator need only rotate the flask with a circular motion. The circular motion will cause the contents to move toward the walls of the flask and permit the liquid in the chambers to drain out and air to enter the chambers. Subsequent heating will quietly boil off the liquid without "bumping." If, however, one does not give a whirling motion to the flask, he can charge the column by heating alone. As the liquid gets hot, it will "bump" and evolve vapor. Some portion of this vapor will be caught and held by one or another of the chambers, and this amount of vapor will be sufficient to start quiet evaporation. In this way, the "anti-bumping" column 40 is charged merely by heating.

Fig. 3 shows an "anti-bumping" column 41 that is almost identical with the "anti-bumping" column 40 positioned in flask 38 in Fig. 2. The column 41 is designed for use in any flask or still and is supported on legs 54. The column 41 has an extension on the top thereof that extends into the neck of the flask and keeps the column in an upright position. The operation of column 41 is identical with the operation of column 40.

Fig. 4 shows a different form of "anti-bumping" column. This column 56 consists of a chamber 58 having an extension on the top thereof, legs 60 attached to the bottom thereof, and an open bottom. Notches or openings 62 are located in the wall of chamber 58. When this column is positioned in a flask and the flask is filled with liquid to be distilled, air is entrapped in the chamber 58, and contacts the liquid in the lower portions thereof. As the liquid in the chamber 58 gets warm, it evolves vapor which bubbles out of the openings 62. Whenever a bubble of vapor is evolved, there is a slight decrease in the pressure in the chamber and more liquid enters the chamber. As the liquid in the chamber continues to vaporize, the level falls below the levels of openings 62 and a bubble escapes, whereupon the level rises. The effect of such an arrangement is the ebullition of vapor and the entrance of liquid which in turn is vaporized. The use of this type of column effectively prevents "bumping" and promotes smooth even boiling around the column 56. If the flask is cooled, the vapor will condense and the chamber 58 will be filled with liquid. To re-charge the device, heat may again be applied to the flask, and as the liquid becomes hot, it will suddenly "bump" and evolve vapor. Some of this vapor will be caught and held by the chamber 58 and the column will be re-charged thereby.

Fig. 5 shows an "anti-bumping" device that is useful in flasks which have rounded bottoms. The device consists of a bent tube 64 having an opening 66 in the bottom thereof and two or more openings 68 in one section thereof. The opposite section is a piece of solid glass rod integral with the tubing described above. This solid section serves to hold the tube down and prevent its floating. When this device is placed in a flask that has a rounded bottom, it locates itself near the source of heat application. When the flask is filled with liquid, air will be entrapped in the upper portion of the tube. This air will contact the liquid in the lower portions of the tube and will foster gradual evolution of vapor. The vapor will bubble out of openings 68, and liquid will enter the device through opening 66. The use of this device concentrates all the evaporation in the tube, since the liquid to be distilled contacts air or vapor at that point. After heating and cooling, the device may be charged by heating. When the liquid becomes hot, it will "bump" and evolve vapor. Some of the vapor will be caught and held in the tube 64, and will serve to charge the device.

Figs. 6 through 9 show four forms of "anti-bumping" devices having substantially the same structure. Figs. 7, 8, and 9 are forms of hollow tetrahedrons, while Fig. 6, like Fig. 15, is a form of a hollow triangular prism. Each of these forms has a hole 70 in the bottom thereof and holes 72 in the walls thereof. These holes are preferably large enough to permit liquid to pass through them easily, and large enough to permit vapor to bubble out through them easily. These forms are so designed that any face may be the bottom, and no matter which face is down, there will always be a closed upper portion, a hole in the bottom, and holes in the walls of the device. The holes 72 in the walls of the device are so located that air or vapor is trapped in the upper portions of the device when the flask, still or evaporator in which the device is used, is filled with liquid. The ridges 74 on the tetrahedron shown in Fig. 7, and the feet 76 shown in Fig. 8 maintain the devices at a definite distance from the bottom of the flask. The devices shown in these four figures trap air when the stills, in which they are used, are filled with liquid, and provide contact between the vapor which they hold and the contents of the still. The design of these devices is such that, after a heating and cooling cycle, they may be charged readily. The bottoms of the devices and the bottoms of the flasks in which the devices are used, serve to confine portions of the liquid. This confinement is not positive, but nevertheless acts to hold a quantity of liquid of small volume and large surface near the source of heat application. The small volume and large surface of the confined liquid serves to cause it to evolve vapor and charge the device through the holes 70 in the bottom thereof. After charging, the device again functions as an "anti-bumping" device.

Fig. 10 shows a section of an "anti-bumping" device that is designed for horizontal tube evaporators. "Bumping" as such is not usually recognized as an existing factor in the operation of tube evaporators, but uneven and violent ebullition of vapor does occur in certain parts of an evaporator. By use of the device shown in Fig. 10 and other devices based on the same principle, evaporation can be made even and quiet. When the evaporator is filled with liquid, air is trapped in the upper portion of the tube 78. This air contacts the liquid that enters through holes 82 and fosters the gradual evolution of vapor therefrom. The vapor bubbles quietly from the holes 80 and more liquid enters the tube 78 through holes 82. In this way, quiet and even evaporation is attained. After a heating and cooling cycle, the vapor in the tube 78 condenses and the tube is filled with liquid. To recharge the tube, the liquid is heated. The heating of the liquid causes one or two "bumps", and the evolution of vapor that coincides with the "bumping" charges the tube. With continued heating, the vapor will work itself along in the tube and completely charge it.

Fig. 11 shows an "anti-bumping" device that is especially useful with vertical tube evaporators. This device may be positioned in the tube and will entrap air when the evaporator is filled with liquid to be evaporated. When the liquid is heated, vapor will be evolved from holes 80 and other liquid will enter through holes 82. Such a device fosters the quiet, even bubbling that assures maximum efficiency for the evaporator.

Figs. 12 through 16 show other forms of "anti-bumping" devices; each of which has an opening in the lower portion thereof, an opening in the wall thereof, and a closed upper portion. The principle on which these devices are based is similar to the principles on which previously described devices are based, and the operation is the same.

Figs. 17 through 19 show devices that are especially useful in preventing "bumping" in vacuum distillations. Each device comprises a flask 84 and a tube 86 communicating with the atmosphere outside of the flask. Each of these tubes has a stopcock or clamp to regulate the flow of air through the tube, and a vapor trap or chamber where air or vapor is held during the distillation. When the flask is filled with liquid to be distilled, a vacuum created in the flask and heat applied, evaporation occurs where the liquid contacts the air that is trapped in the tube 86. The vapor evolved will bubble out of holes 80, and liquid will enter the tube 86 through holes 82. Since vapor has a larger volume per unit of weight than liquid has, fewer holes are necessary for the liquid. When the flask is cooled, the vapor condenses and the tube 86 is filled with liquid. To recharge the tube, it is necessary only to open the stopcock or clamp a little, and air will flow into the tube because of the difference in pressure between the inside and outside of the flask. The stopcock may then be shut off and the flask heated. The air that enters through the tube will displace the liquid in the tube and thereby charge it. This renders the tube effective as an "anti-bumping" device.

All of the devices shown in the drawings operate on the principle of holding a substantial amount of air or vapor in contact with liquid near the source of heat application, and providing adequate means for outlet of vapor, and adequate means for the inlet of liquid. This requires at least two openings of substantial area at different levels, and has been found to work best where there are a number of openings. With these devices, any ordinary distillable liquid may be made to distill or boil evenly without "bumping."

What I claim is:

1. A device to prevent "bumping" in vaporization processes, comprising a chamber having an upper and a lower portion, said upper portion being closed, an opening in the lower portion to admit liquid to be vaporized, and an opening below the closed upper portion but above said first opening in the lower portion, said second opening being adapted to permit vapor to leave said chamber, said device being arranged to foster the smooth, even vaporization of the liquid to be vaporized.

2. An "anti-bumping" device for vaporization processes to entrap vapor therein when said device is surrounded with liquid, said device comprising a chamber having at least two openings therein, one of the openings in said device being adapted to permit evolution of vapor therethrough, and another opening below said first opening to permit liquid to enter said device.

3. An "anti-bumping" device for vaporization apparatus comprising a chamber to entrap a substantial amount of vapor therein when said device is positioned in liquid to be vaporized, said chamber being arranged to permit a portion of the liquid to be vaporized to enter the chamber and contact the vapor therein, said chamber being arranged to hold the vapor and the liquid that contacts the vapor in proximity to the heating surface of said vaporization apparatus, said chamber being arranged to have a closed upper portion, an opening in the lower portion to admit liquid to be vaporized, and a second opening above said first opening whenever said device is in an operating position.

4. An "anti-bumping" device for vaporization apparatus comprising a chamber having a closed upper portion, an open lower portion, and an opening between said lower and said upper portion, said device being adapted to rest on the bottom of said vaporization apparatus and be charged by the heating of the liquid to be vaporized.

5. An "anti-bumping" device for vaporization processes, comprising a chamber having a triangular cross section, a plurality of faces, and an opening in the center of each face thereof, said device being adapted to have a closed upper portion, an opening in the bottom face, and an opening in each of the side faces thereof, regardless of position in the vaporization apparatus.

6. An "anti-bumping" device to be used in vaporization apparatus, comprising a chamber having an upper portion and a lower portion, said upper portion being closed, an opening in the lower portion, a second opening in the lower portion positioned above the first opening, and a tube arranged to communicate with the atmosphere outside of said vaporization apparatus, said device being arranged to be charged by air entering said chamber through said tube.

7. An "anti-bumping" device for vaporization processes having substantially the shape of a hollow tetrahedron, said device having a plurality of openings therein, said device being arranged to assume one of a plurality of positions whenever it is placed in the liquid to be vaporized, said device being arranged to have a closed upper portion, a plurality of openings below said closed upper portion, and an opening in the bottom thereof whenever said device assumes one of the said positions.

8. An anti-bumping" device for vaporization processes having substantially the shape of a hollow triangular prism, said device having a plurality of openings therein, said device being arranged to assume one of a plurality of positions whenever it is placed in the liquid to be vaporized, said device being arranged to have a closed upper portion, a plurality of openings below said closed upper portion, and an opening in the bottom thereof whenever said device assumes one of the said positions.

9. An "anti-bumping" device for vaporization processes having three sides, two end portions, and an opening in each of the said sides, said sides being longer than any edge of said end portions, said openings being positioned so that the device has a closed upper portion, an opening below said closed upper portion to permit evolution of vapor, and an opening in the bottom of said device whenever the device is setting on one of its sides.

10. An "anti-bumping" device for use in vaporization processes comprising a tube positioned in a flask, said tube having one end thereof in communication with the atmosphere outside of said flask, means to regulate the flow of air through the tube, a bent portion cooperating with a sealed end of the tube to form a chamber to entrap vapor therein when the flask has liquid therein, said chamber having a closed upper portion, an opening below said upper portion and a second opening below the first opening, and being arranged to be charged with air by the passage of air through said tube.

11. An "anti-bumping" device for use in vaporization apparatus, having substantially the shape of a hollow tetrahedron, each of the four faces of said tetrahedron having an opening approximately in the center thereof.

12. An "anti-bumping" device for use in vaporization apparatus, having substantially the shape of a hollow triangular prism, each of the three side faces of said prism having at least one opening placed approximately midway between the side edges of said face.

13. An "anti-bumping" device for use in vaporization apparatus made of metal, comprising a vapor trap having an opening for vapor and an opening for liquid.

14. An "anti-bumping" device for vaporization processes comprising a chamber to entrap vapor therein whenever said device is placed in a liquid to be vaporized, said device having a plurality of faces, and an opening in at least two of the said faces, said device being formed to have a triangular cross-section, and said device being arranged to have a closed upper portion, an opening below said upper portion and an opening in the bottom thereof whenever said device is in an operating position.

15. An "anti-bumping" device for vaporization processes comprising a chamber having a plurality of faces, and an opening in at least two of the said faces, said device being formed so that when it is cut by a plane parallel to one face thereof it will have a triangular cross-section, and said device being arranged to have a closed upper portion, an opening below the said upper portion and an opening in the bottom thereof whenever said device is in an operating position.

16. An "anti-bumping" device for vaporization processes comprising a chamber having a plurality of faces, and an opening in at least three of the said faces, said device being formed to have at least one triangular cross-section, and said device being arranged to have a closed upper portion, a plurality of openings below the upper portion, and an opening in the bottom thereof whenever said device is in an operating position.

17. An "anti-bumping" device for vaporization processes comprising a chamber having a plurality of openings therein, said device being arranged to assume one of a plurality of positions when placed in the liquid to be vaporized, and said device being arranged to have a closed upper portion, an opening below the closed upper portion, and an opening in the bottom thereof whenever said device assumes one of the said positions.

18. An "anti-bumping" device for use in vaporization processes which is a member of the group comprising a hollow tetrahedron having at least one opening in each of its faces and a relatively long hollow triangular prism having at least one opening in each of its three side faces, said "anti-bumping" device having at least one triangular cross-section whereby said device will have a closed upper portion, at least one opening below said closed upper portion for egress of vapor and at least one opening in its bottom face for ingress of liquid, whenever the device is in a position of stable equilibrium.

19. An "anti-bumping" device for use in vaporization apparatus, comprising a tube positioned in said vaporization apparatus, said tube having one end thereof in communication with the atmosphere outside of said vaporization apparatus, means to regulate the flow of gaseous medium through said tube, a portion of said tube being arranged to entrap vapor therein when liquid is placed in the vaporization apparatus, said portion of the tube being arranged to hold said vapor in proximity to the heating surface of the vaporization apparatus, said portion of the tube having at least one opening to permit liquid to enter the tube and at least one opening to permit vapor to leave the tube.

GEORGE L. DOELLING.